United States Patent Office 3,669,744
Patented June 13, 1972

---

3,669,744
HERMETICALLY SEALED NICKEL-HYDROGEN STORAGE CELL
Boris Ioselevich Tsenter, Nalichnaya ulitsa dom 41, korpus 1, kv. 9; Vyacheslav Mikhailovich Sergeev, Guanskaya ulitsa 15, kv. 10; and Alexandr Ilich Kloss, Omskaya ulitsa 13, kv. 12, all of Leningrad, U.S.S.R.
Filed Feb. 25, 1971, Ser. No. 118,645
Int. Cl. H01m 29/02
U.S. Cl. 136—28
2 Claims

ABSTRACT OF THE DISCLOSURE

The present invention relates to chemical sources of electricity, and more specifically to hermetically sealed nickel-hydrogen storage cells.

A hermetically sealed nickel-hydrogen storage cell with positive nickel-oxide electrodes and negative hydrogen electrodes according to the invention is characterized in that the thicknesses of the negative and positive electrodes are in the ratio of from 1:1 to 1:20; the volume of electrolyte and the volume of the pores in said electrodes and said separator are in the ratio from 5:10 to 9:10; and there is $0.5 \times 10^{-3}$ to $2 \times 10^{-3}$ cubic metres of gas per kilogram (mass) of nickel hydroxide in the positive nickel-oxide electrode.

---

The present invention relates to chemical sources of electricity, and more specifically to hermetically sealed alkaline nickel-hydrogen storage cells.

In the prior art, there is an alkaline nickel-hydrogen storage cell with a positive nickel-oxide electrode and a negative hydrogen electrode made in the form of a porous matrix.

This prior-art hermetically sealed nickel-hydrogen storage cell has no substantial advantages over, say a hermetically sealed nickel-cadmium storage cell with cermet electrodes.

Besides, the hydrogen electrode of the prior-art storage cell is not protected against deep anode polarization which is likely to occur after a reversal of polarity in the cell, which drastically impairs the electrical characteristics of the storage cell in service.

An object of the present invention is to avoid these disadvantages.

The invention is aimed at providing, by a proper choice of respective parameters, a hermetically sealed nickel-hydrogen storage cell having high electric characteristics, and ensuring protection of the hydrogen electrode against deep anode polarizations likely to occur after a reversal of polarity in the cell.

With this aim in view, the invention resides in that in a hermetically sealed nickel-hydrogen storage cell the thicknesses of the negative and positive electrodes may be in the ratio of from 1:1 to 1:20, the volumes of the electrolyte and pores in the electrodes and separators are in the ratio from 5:10 to 9:10, and there is from $0.5 \times 10^{-3}$ to $2 \times 10^{-3}$ cubic metres of gas per kilogram of mass of nickel hydroxide.

It is preferable to make some of the positive electrodes of the storage cell from unformed hydrated nickelous oxide, and this part may account for 0.3 to 0.8 of the total number of nickel-oxide electrodes.

One of the embodiments of the hermetically sealed nickel-hydrogen storage cell disclosed herein has the following service characteristics:

Energy per unit weight _____ w.h./kg__ 55 to 60
Energy per unit volume _____ w.h./litre__ 85 to 90

Average discharge voltage:
At current of 0.25C _____ v__ 1.25
At current of 1.0C _____ v__ 1.18
Charge current:
Without indication of end of charge _____ C__0.1
With indication of end of charge __C__ 0.25 to 0.5
wherein C is the nominal capacity of the storage cell.
Operating temperature range _____° C__ +50 to −20
Service life _____ cycles__ 1000

In view of the high energy per unit weight and volume, hermeticity of the cell, adaptability for recharging, simplicity of operation, and long service life, it may be expected that the hermetically sealed nickel-hydrogen storage cell disclosed herein may be used as a source of power for electromobiles, electric industrial trucks, loaders, and in a variety of floating power systems.

The invention will be more fully understood from the following description of a preferred embodiment when read in connection with the accompanying drawings wherein.

Figure 1:
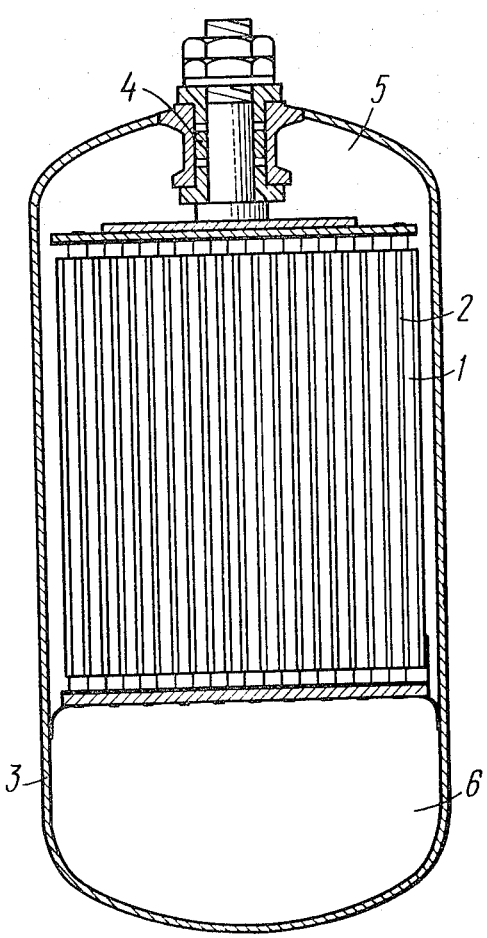
FIG. 1 is a sketch of a hermetically sealed nickel-hydrogen storage cell according to the invention.

Referring to FIG. 1, there is a hermetically sealed nickel-hydrogen storage cell consisting of positive nickel-oxide electrodes 1 and negative hydrogen electrodes 2 separated by a separator and placed in a tank 3 capable of standing up to a considerable pressure of hydrogen, sealed with a seal 4. The tank has two gas chambers 5 and 6.

Consider operation of the hermetically sealed nickel-hydrogen storage cell. In charging, hydrogen is evolved at the negative hydrogen electrode. This hydrogen accumulates under pressure throughout the free volume of the cell, including the unoccupield pores in the positive nickel-oxide electrode 1.

In discharging, the hydrogen is ionized at the same negative hydrogen electrode 2.

Contact between the negative active material, hydrogen, and the positive nickel-oxide electrode 1 is of no consequence, because the reaction

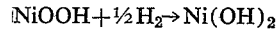

$$\text{NiOOH} + \tfrac{1}{2}\text{H}_2 \rightarrow \text{Ni(OH)}_2$$

is heavily handicapped kinetically.

The positive nickel-oxide electrode 1 behaves in the usual manner.

Thus, the hermetically sealed nickel-hydrogen storage cell disclosed herein depends for its operation on selective catalysis.

Since gaseous fuel (hydrogen) need not be isolated from the solid oxidizer (hydrated nickelous oxide), the hermetically sealed nickel-hydrogen storage cell disclosed herein is rather simple in construction and enables every unit of free space in the cell to be utilized to advantage.

The negative hydrogen electrode 2 is a promoted porous nickel-base cermet matrix. Similar, but unpromoted nickel matrices are used in the fabrication of cermet electrodes for nickel-cadmium storage cells.

Since the negative hydrogen electrode 2 does not contain any active material, hydrogen, and only serves as a venue of a current-generating reaction, its thickness may be selected from considerations of power rating and is determined by the depth to which the current-generating process can penetrate its porous body.

The thicknesses of the positive nickel-oxide electrode 1 and the negative hydrogen electrode 2 may be in the ratio from 1:1 to 20:1.

In cases where higher energies per unit weight and volume are essential, it is preferable to use the thicknesses in the ratio 3 to 1. The thicknesses of the negative hydrogen electrode 2 and the positive nickel-oxide electrode 1 in the hermetically sealed nickel-hydrogen storage cell shown in FIG. 1 is 3 to 1. In this case the energy of the cell per unit weight is 60 w.h./kg.

As follows from the foregoing, the hermetically sealed nickel-hydrogen storage cell disclosed herein operates at an elevated hydrogen pressure of about 100 atm.

A detailed analysis would show that an elevated hydrogen pressure is preferable in cases where the decisive criterion is energy per unit volume. In cases where the decisive criterion is energy per unit weight, a much lower pressure ought to be used. The amount of hydrogen is determined by the mass of hydrated nickelous oxide used, and the pressure is determined by the free space available, which can be controlled with the aid of the gas chambers 5 and 6.

Thus, the gas volume per unit mass of hydrated nickelous oxide is an important structural parameter determining the pressure in the hermetically sealed nickel-hydrogen storage cell. The optimum value of this parameter lies anywhere between $0.5 \times 10^{-3}$ and $2 \times 10^{-3}$ cubic metres per kilogram.

Since in discharging, the hydrogen pressure in a hermetrically sealed nickel-hydrogen storage cell decreases linearly, it is important to ensure transport of molecular hydrogen to the negative hydrogen electrode, which should be such that the current through the electrode 2 be greater than the discharge current over the entire range of pressure variations.

This point calls for use of a precisely proportional electrolyte in the manufacture of a hermetically sealed nickel-hydrogen storage cell.

The optimum ratio (the one corresponding to high energies per unit volume and weight and high power output) of the electrolyte volume to that of pores in the electrodes and separator is from 5:10 to 9:10. This ratio provides for activating and resistive operation of the negative hydrogen electrode 2 under which polarization is practically independent of pressure, on the one hand, and ensures the requisite quantity of electrolyte in the positive and negative electrodes 1 and 2, and in the inter-electrode space, on the other.

Operating under a high hydrogen pressure, the hermetically sealed nickel-hydrogen storage cell disclosed herein is completely protected from an excessive rise of pressure on recharging owing to a closed oxygen cycle.

Figure 2:
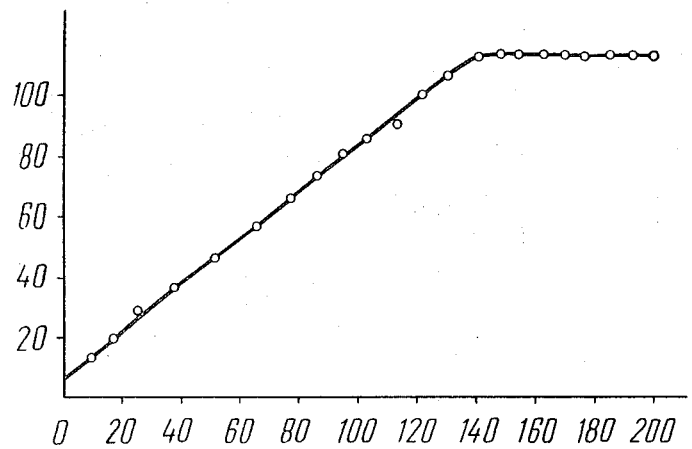
FIG. 2 is a plot relating hydrogen pressure to the state of charge on charging.

The oxygen evolved at the positive nickel-oxide electrode 1 is partly ionized at the negative hydrogen electrode 2 and is accumulated in the gas space of the hermetically sealed nickel-hydrogen storage cell. As soon as the partial pressure of oxygen provides for an oxygen ionization current at the negative hydrogen electrode 2 equal to the charging current, the pressure ceases to rise. This process is represented by the horizontal portion of the plot of FIG. 2 relating pressure to the stage of charge on charging. The kink in the curve corresponds to 140 percent of charge-capacity, when the positive nickel-oxide electrode 1 is fully charged.

The oxygen cycle described above is similar to the same cycle in a hermetically sealed nickel-cadmium storage cell, with two important differences:

(1) Oxygen ionization occurs at a hydrogen gas electrode capable of high rates of gas absorption.

(2) The rate of gas absorption remains constant, since the surface area of the negative hydrogen electrode remains likewise unchanged.

Owing to these two features, the hermetically sealed nickel-hydrogen storage cell disclosed herein compares favourably with any other hermetically sealed storage cell in that it provides for high charging currents and reliable gas absorption. The only limitation for charging current is the heating of the cell.

As will be recalled, deep anode polarization (to the potentials of oxygen evolution) inhibits the hydrogen electrode. This situation may arise after a reversal of polarity in a hermetically sealed nickel-hydrogen storage cell used in a battery. Both the operating principle and the construction of the hermetically sealed nickel-hydrogen storage cell disclosed herein make it possible to protect the negative hydrogen electrode 2 (FIG. 1) from deep anode polarization with the aid of a closed hydrogen cycle. For this purpose, conditions are created under which the first to part with its charge on a discharge is the positive nickel-oxide electrode 1.

In this case, hydrogen begins to be evolved at it. An equivalent amount of hydrogen is ionized at the negative hydrogen electrode 2. The requisite surplus amount of hydrogen is secured by combining formed and unformed positive nickel-oxide electrodes 1.

The use of some unformed positive nickel-oxide electrodes 1 results in a constant residual hydrogen pressure in the hermetically sealed nickel-hydrogen storage cell owing to the lower utilization of the unformed positive nickel-oxide electrodes 1 during the first cycle. This constant hydrogen buffer is responsible for two positive effects: (1) it protects the negative hydrogen electrode from deep anode polarization; (2) it limits the reverse voltage across the hermetically sealed nickel-hydrogen storage cell to 0.4–0.5 v., which is sufficiently important if the voltage across a battery is required to vary within very narrow limits.

Figure 3:
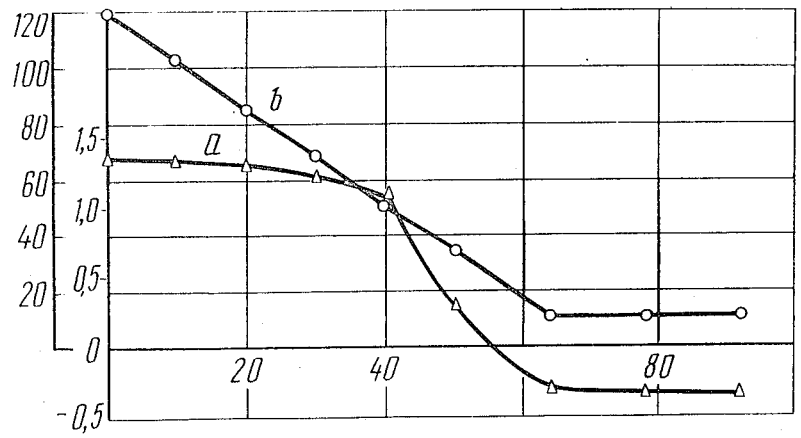
FIG. 3 is a plot relating voltage and hydrogen pressure in a hermetically sealed nickel-hydrogen storage cell on a deep discharge.

The effect of the closed hydrogen cycle is illustrated in the plot of FIG. 3 where curve "a" represents variations in voltage and curve "b" variations in pressure during a discharge, with the hermetically sealed nickel-hydrogen storage cell undergoing a reversal of polarity. As follows from the plot of FIG. 3, both the pressure and the voltage of a hermetically sealed nickel-hydrogen storage cell remain stable in the case of a sufficiently deep discharge and charge of the cell (100 percent relative to the effective capacity of the cell).

The residual pressure will vary with a change in the conditions under which a hermetically sealed nickel-hydrogen storage cell is made to operate. The maximum pressure of hydrogen will be determined by a number of service conditions. Accordingly, these factors should be taken into consideration when determining the share of unformed positive nickel-oxide electrodes 1, which may vary from 0.3 to 0.8 of the total number and is given by $$d = 5 P_{\text{resid}} / P_{\text{max}}$$

where $d$ = share of unformed positive nickel-oxide electrodes;
$P_{\text{resid}}$ = residual hydrogen pressure;
$P_{\text{max}}$ = max. hydrogen pressure in a fully charged hermetically sealed nickel-hydrogen storage cell.

The table that follows shows several modifications of the hermetically sealed nickel-hydrogen storage cell disclosed herein:

| Type of positive nickel-oxide electrode | Type of negative hydrogen electrode | Ratio of electrode thicknesses | Gas, m.³ per unit [1] | Volume ratio [2] | Share of unformed positive nickel-oxide [3] |
|---|---|---|---|---|---|
| Foil | Promoted foil matrix. | 1:1 | $0.5 \times 10^{-3}$ | 0.5 | 0.3 |
| Cermet | Promoted cermet matrix. | 1:3 | $0.75 \times 10^{-3}$ | 0.65 | 0.4 |
| Plate | Promoted cermet matrix. | 1:20 | 2 | 0.9 | 0.8 |

[1] Mass of nickel-oxide electrode in kg.
[2] Electrolyte to pores in electrodes and separator.
[3] Electrodes relative to total number of positive nickel-oxide electrodes.

| Specific weight energy, w. hr./kg.: | Specific weight power, w./kg. |
|---|---|
| 20 | 250 |
| 55-60 | 100 |
| 10 | 10 |

What is claimed is:

1. A hermetically sealed nickel-hydrogen storage cell comprising: positive nickel-oxide electrodes and negative hydrogen electrodes separated by a separator; an electrolyte filling the pores of said electrodes and separator; the thicknesses of said negative and positive electrodes being in the ratio from 1:1 to 1:20; the volume of the electrolyte and the volume of the pores in said electrodes and said separator being in the ratio from 5:10 to 9:10; and there is $0.5 \times 10^{-3}$ to $2 \times 10^{-3}$ cubic metres of gas per kilogram (mass) of nickel hydroxide in the positive nickel-oxide electrode.

2. A hermetically sealed nickel-hydrogen storage cell, as claimed in claim 1, in which some of said positive nickel-oxide electrodes are made of unformed hydrated nickelous oxide and account for 0.3 to 0.8 of the total number of positive nickel-oxide electrodes.

References Cited
UNITED STATES PATENTS

| | | | |
|---|---|---|---|
| 3,317,349 | 5/1967 | Elliott et al. | 136—86 S |
| 3,356,533 | 12/1967 | Carson, Jr. | 136—28 X |
| 3,393,098 | 7/1968 | Hartner et al. | 136—86 D |
| 3,446,675 | 5/1969 | Jost | 136—86 A |
| 3,507,704 | 4/1970 | Webb | 136—86 R |
| 3,565,691 | 2/1971 | Strier et al. | 136—86 R |

ALLEN B. CURTIS, Primary Examiner

U.S. Cl. X.R.

136—86 R